June 17, 1930. G. H. GEBHARDT 1,765,228
WIRE LOOP BENDING MACHINE
Filed Jan. 11, 1929 15 Sheets-Sheet 1

Inventor:—
Gustav H. Gebhardt
by his Attorneys
Howson + Howson

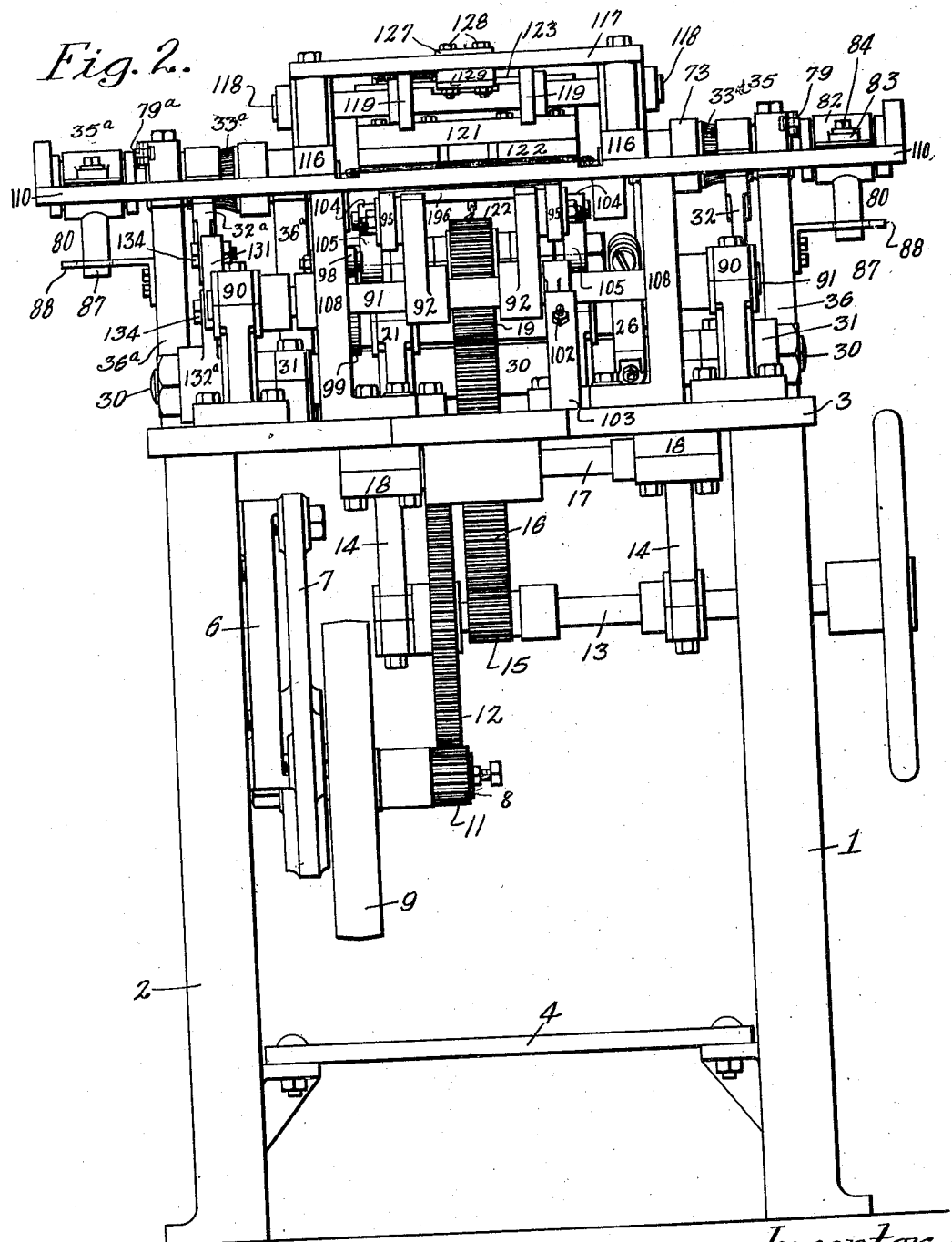

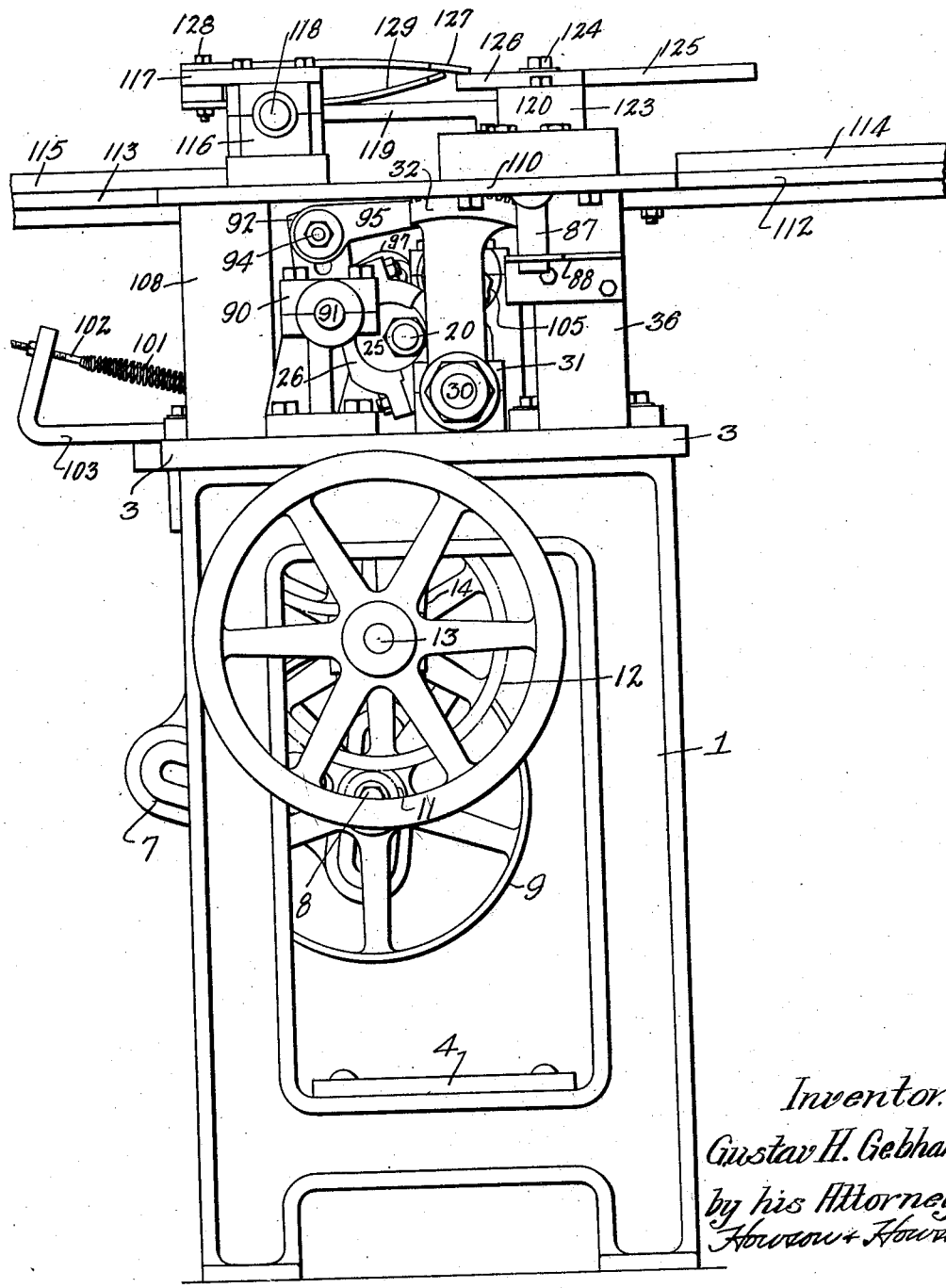

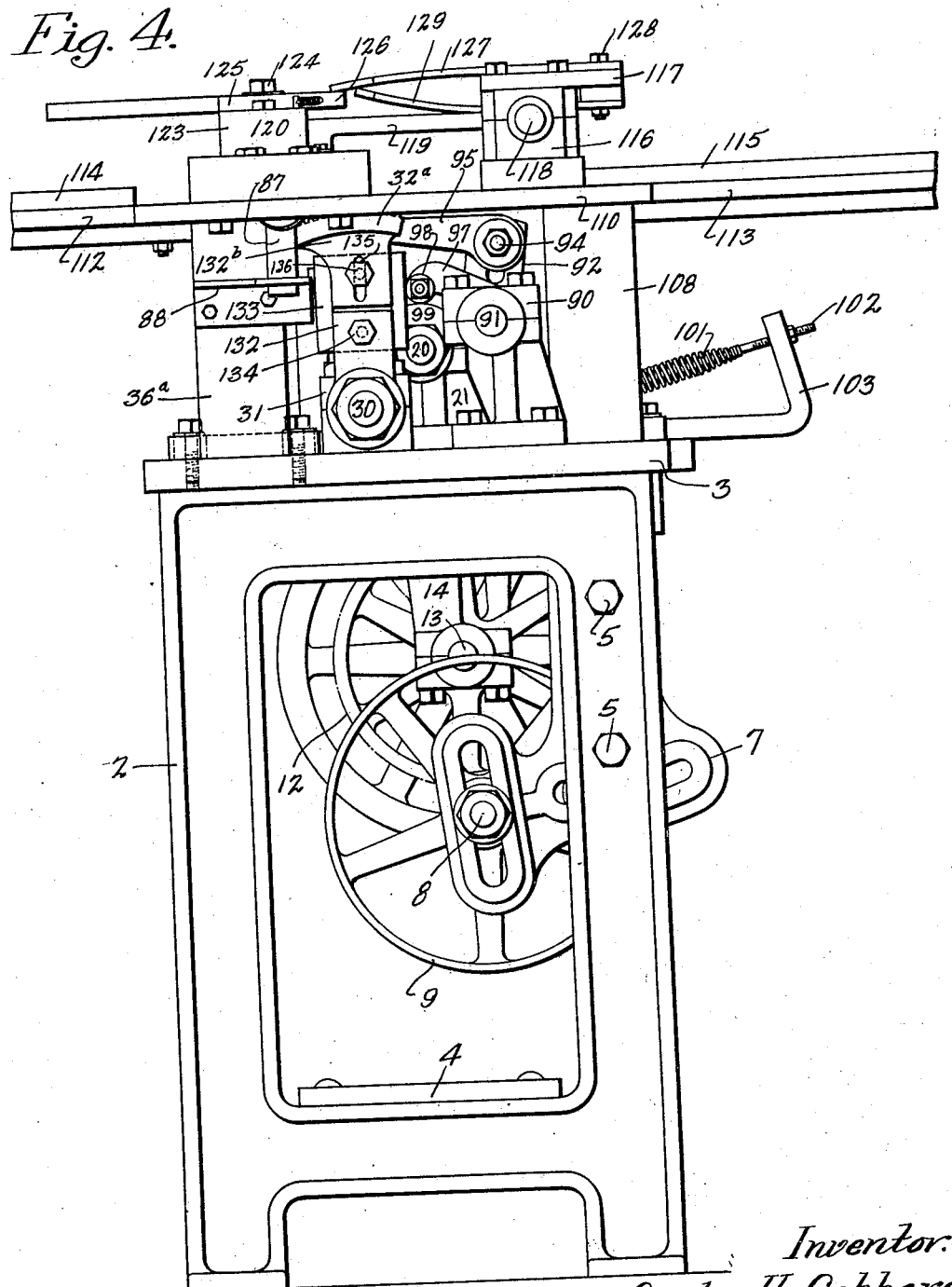

June 17, 1930.　　　G. H. GEBHARDT　　　1,765,228
WIRE LOOP BENDING MACHINE
Filed Jan. 11, 1929　　　15 Sheets-Sheet 5
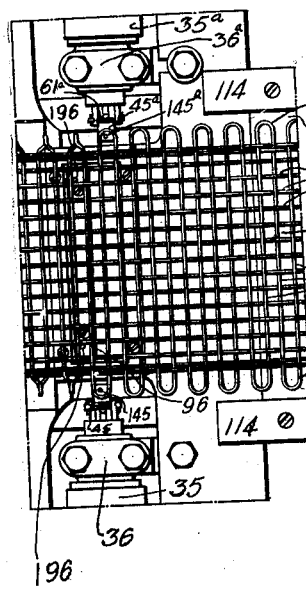
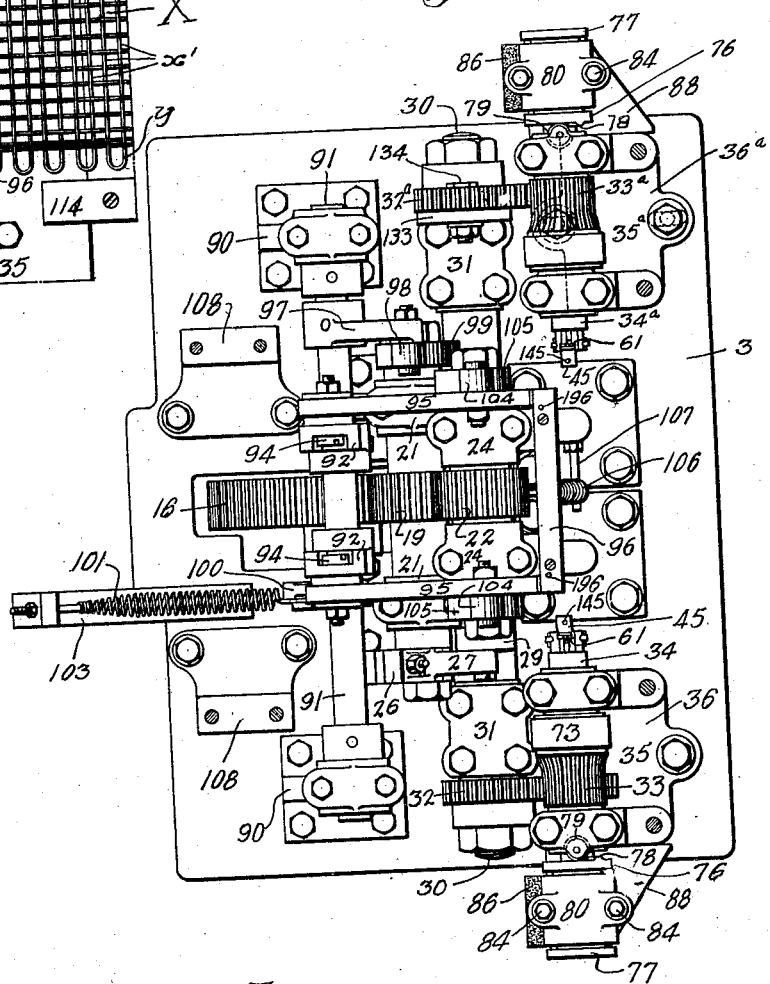
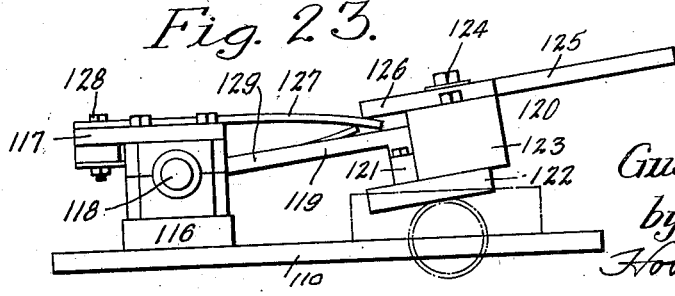
Inventor:—
Gustav H. Gebhardt
by his Attorneys
Howson & Howson

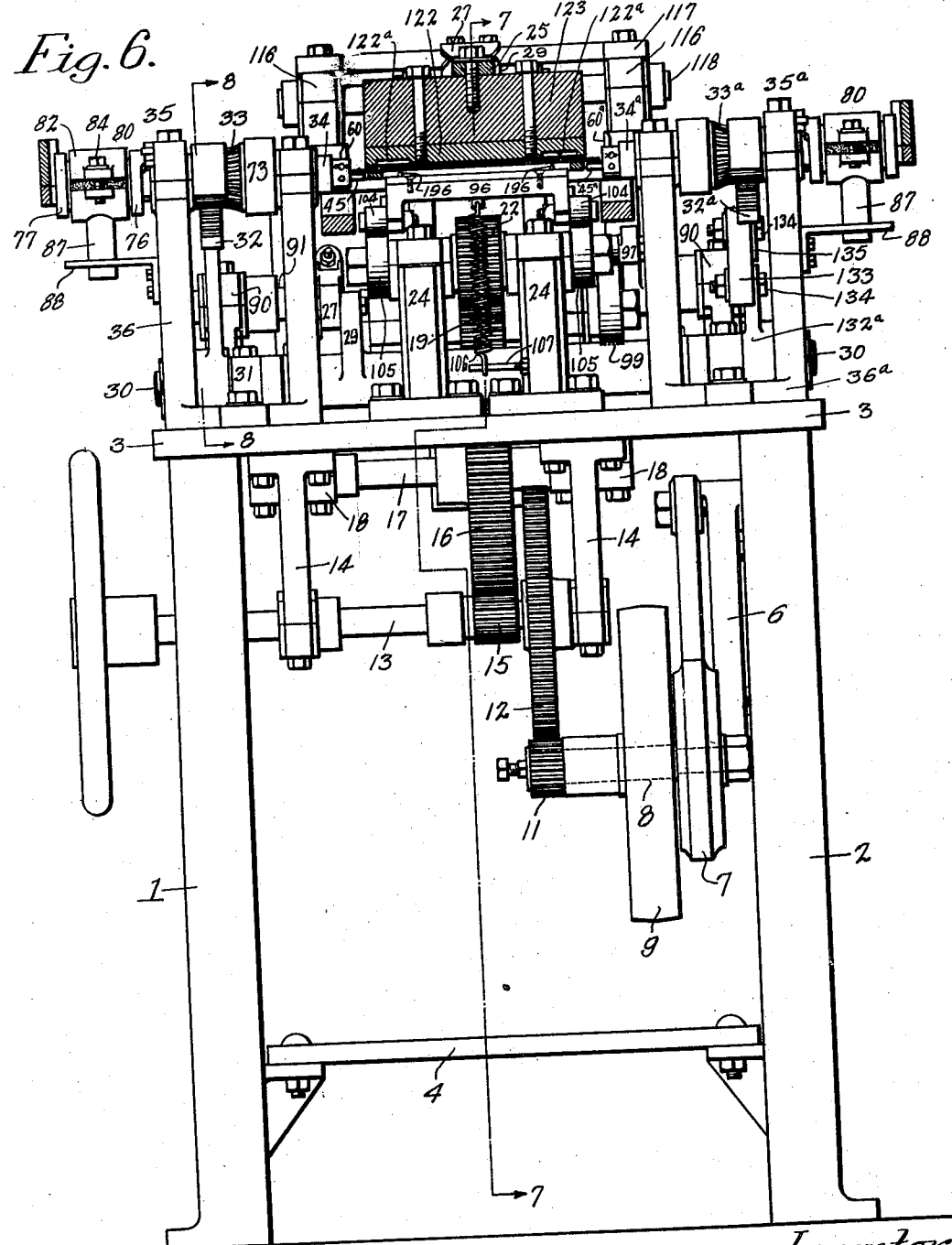

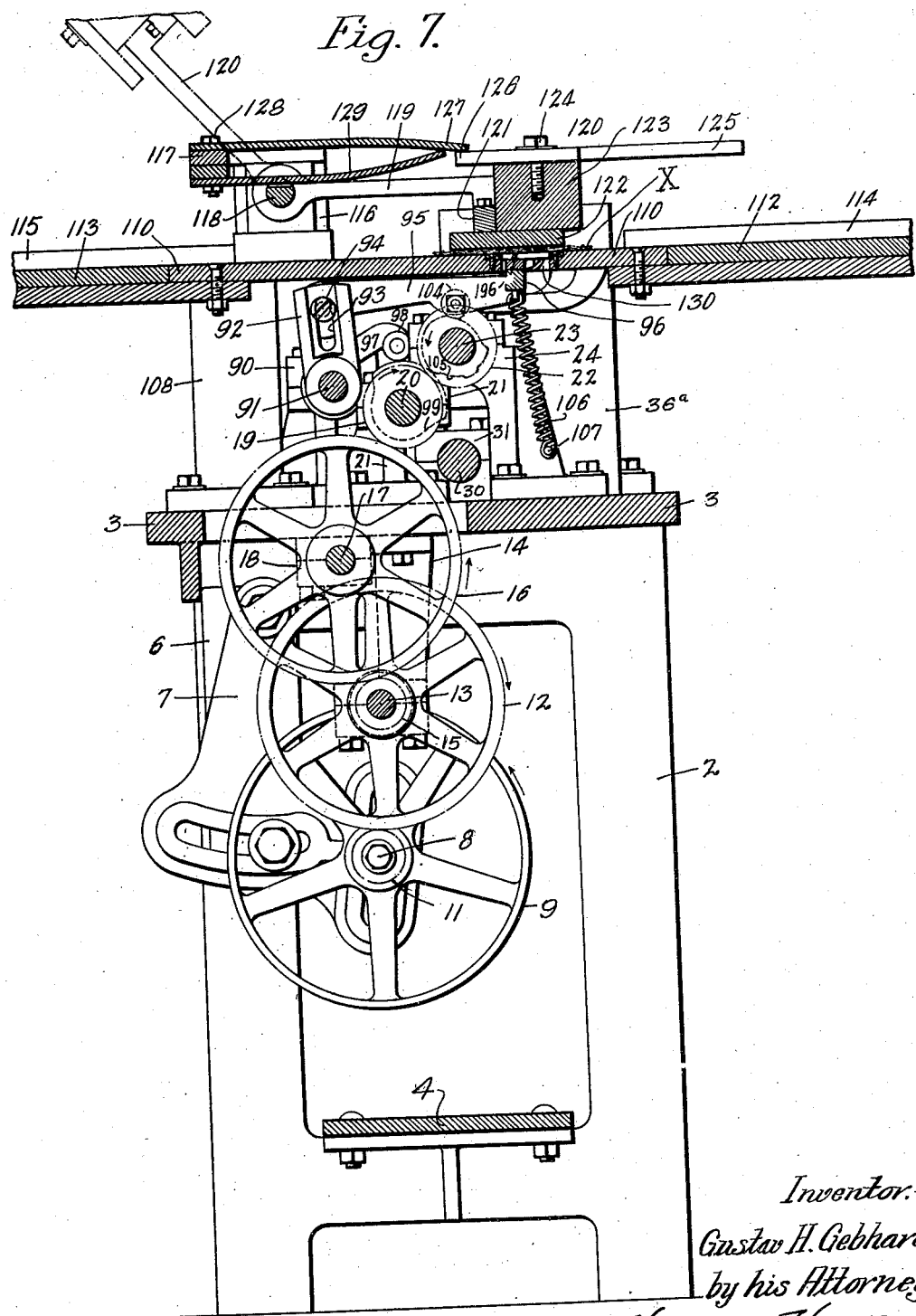

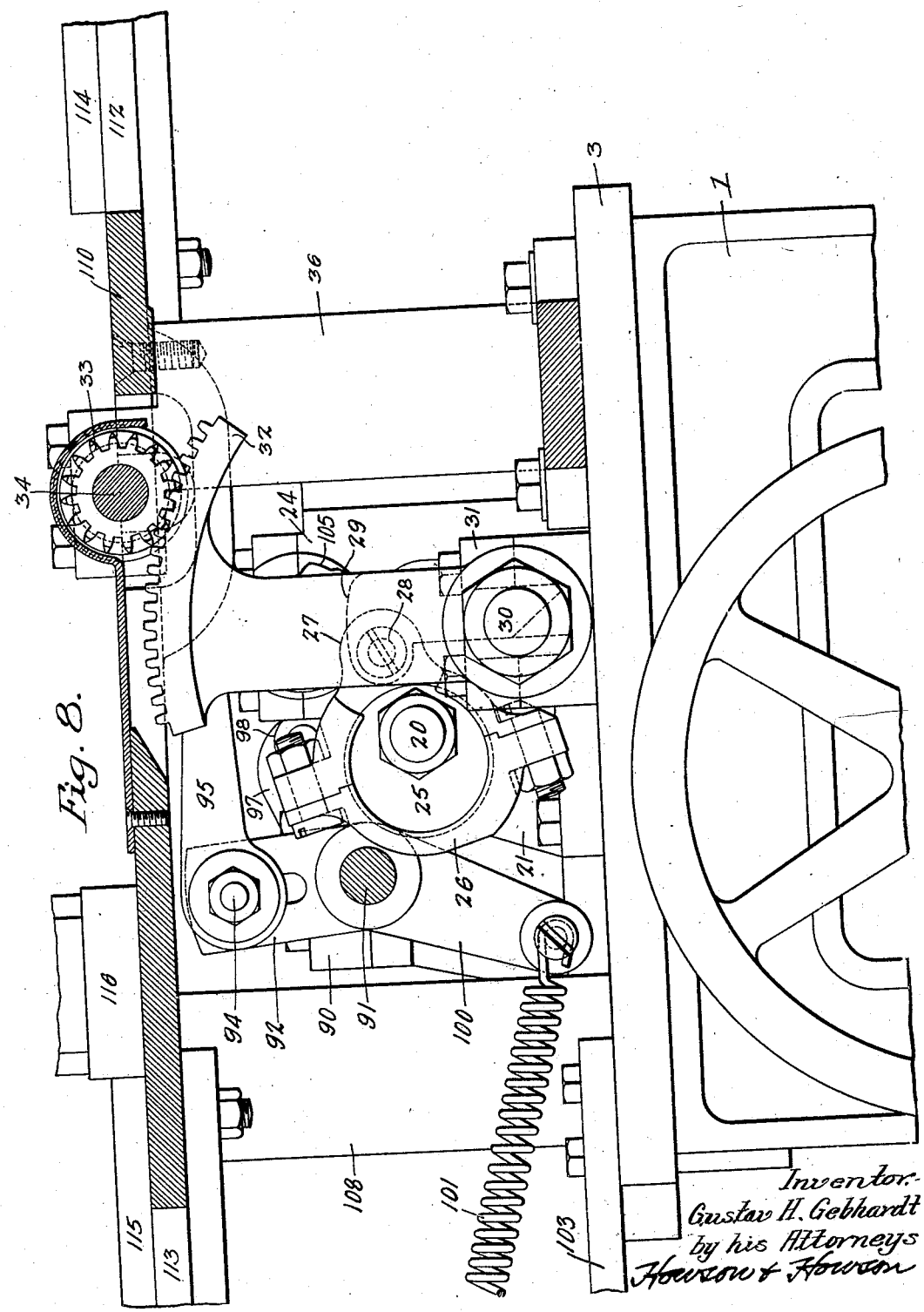

June 17, 1930.  G. H. GEBHARDT  1,765,228
WIRE LOOP BENDING MACHINE
Filed Jan. 11, 1929   15 Sheets-Sheet 9
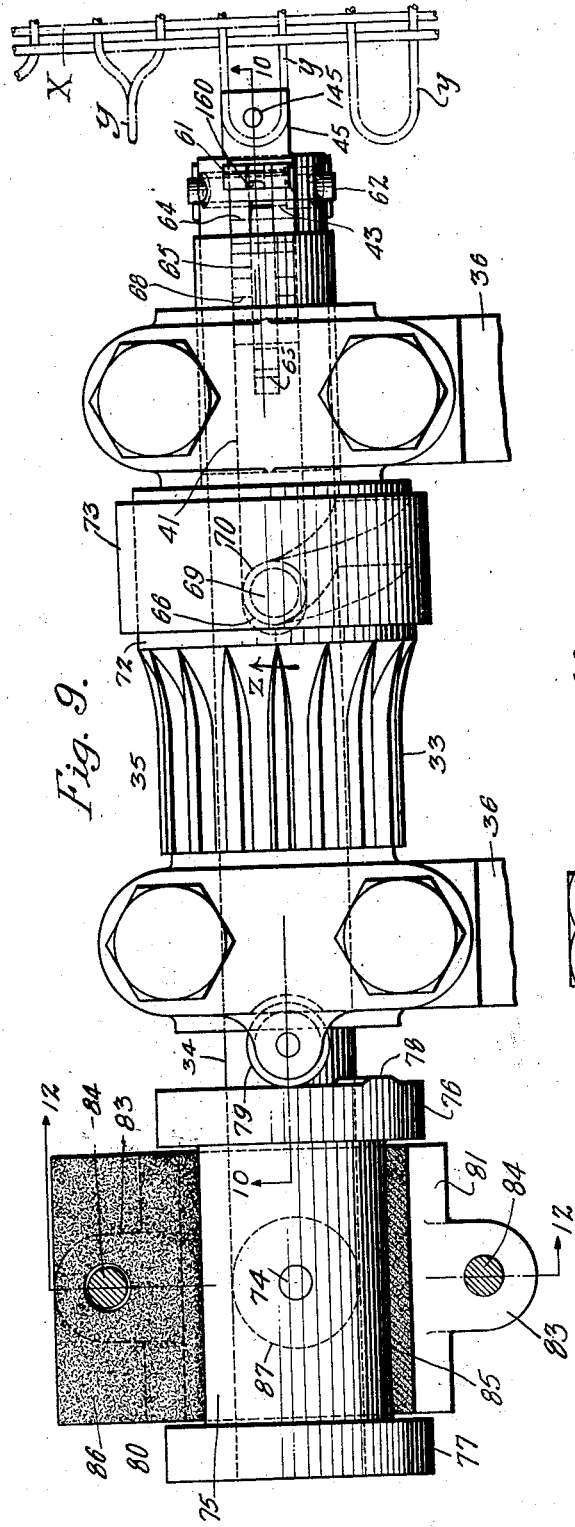
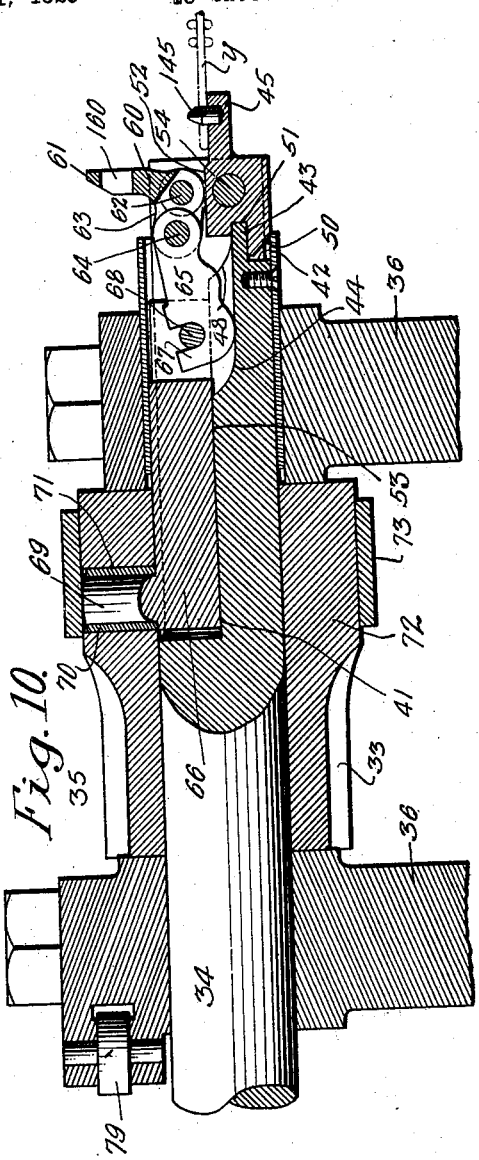
Inventor:—
Gustav H. Gebhardt
by his Attorneys
Howson + Howson

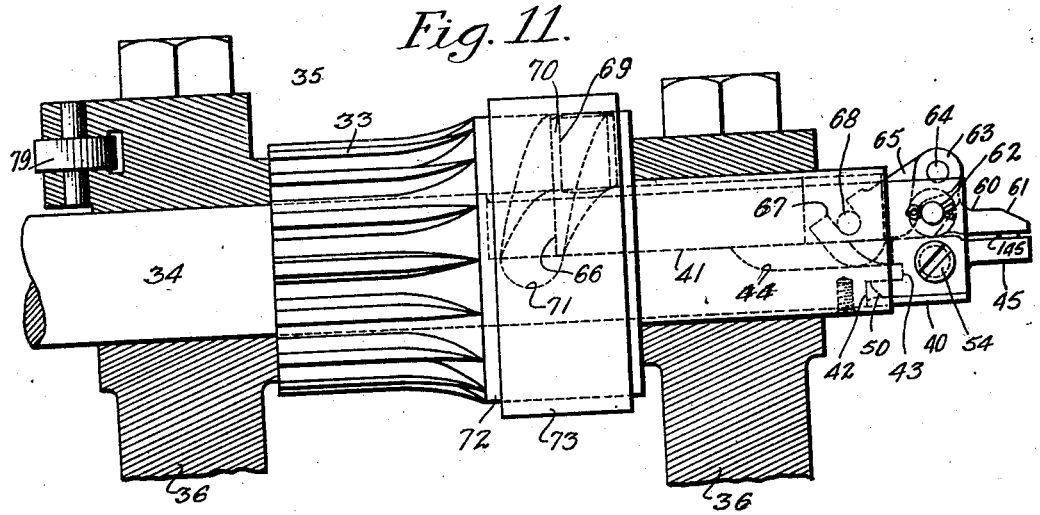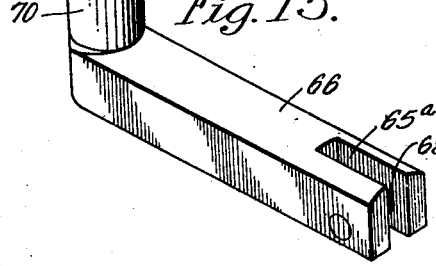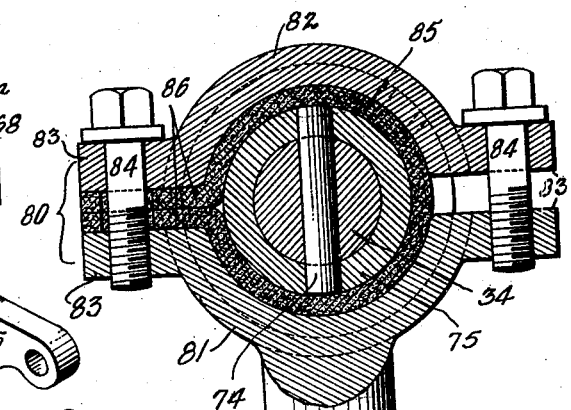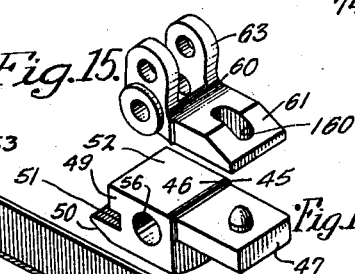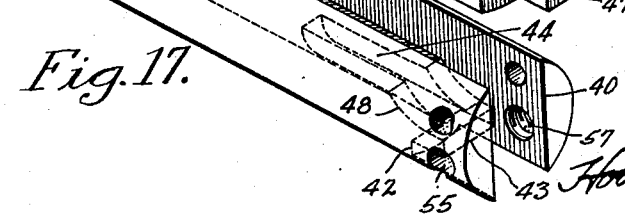

June 17, 1930.  G. H. GEBHARDT  1,765,228
WIRE LOOP BENDING MACHINE
Filed Jan. 11, 1929   15 Sheets-Sheet 11

Inventor.—
Gustav H. Gebhardt
by his Attorneys
Howson & Howson

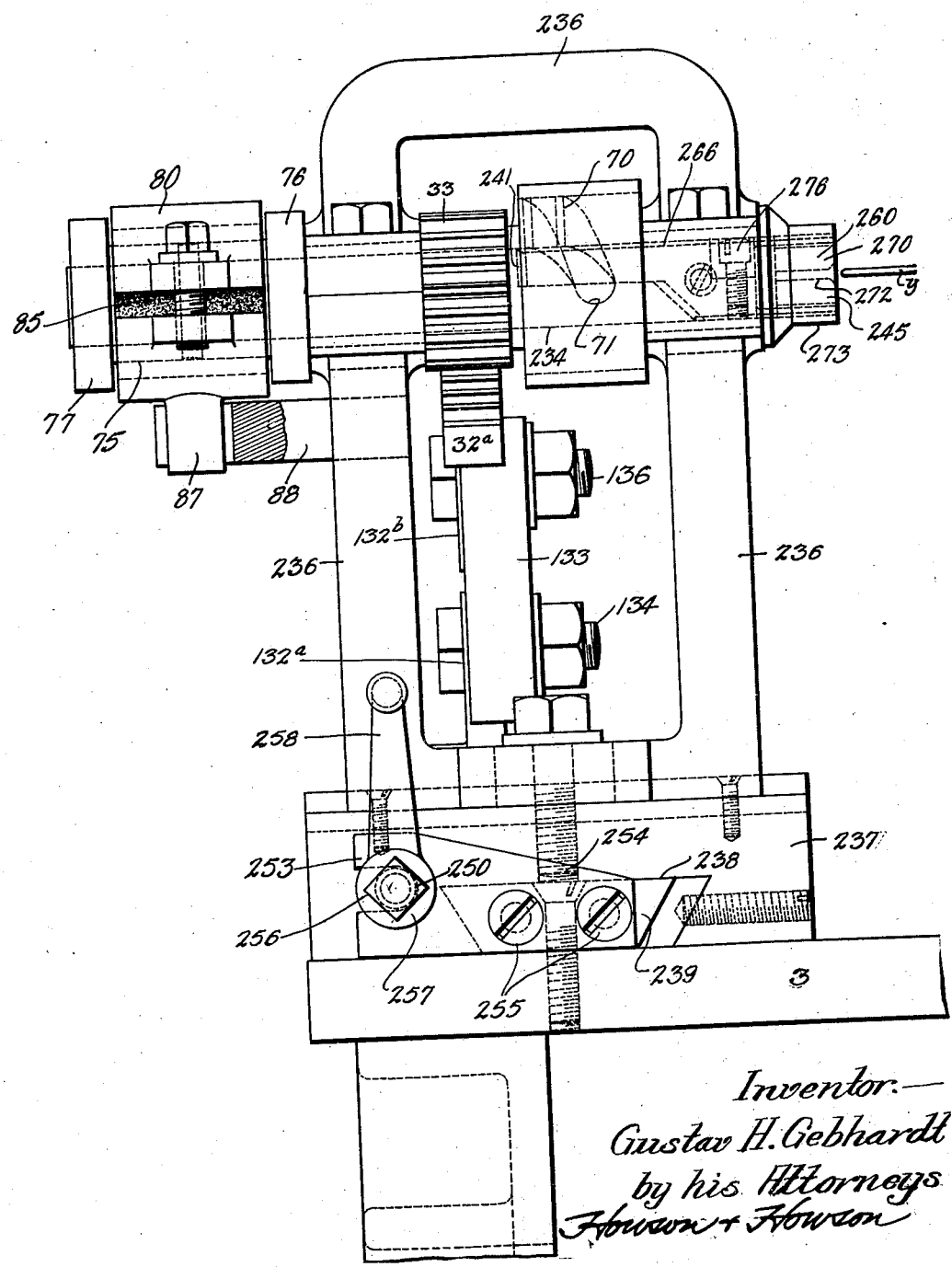

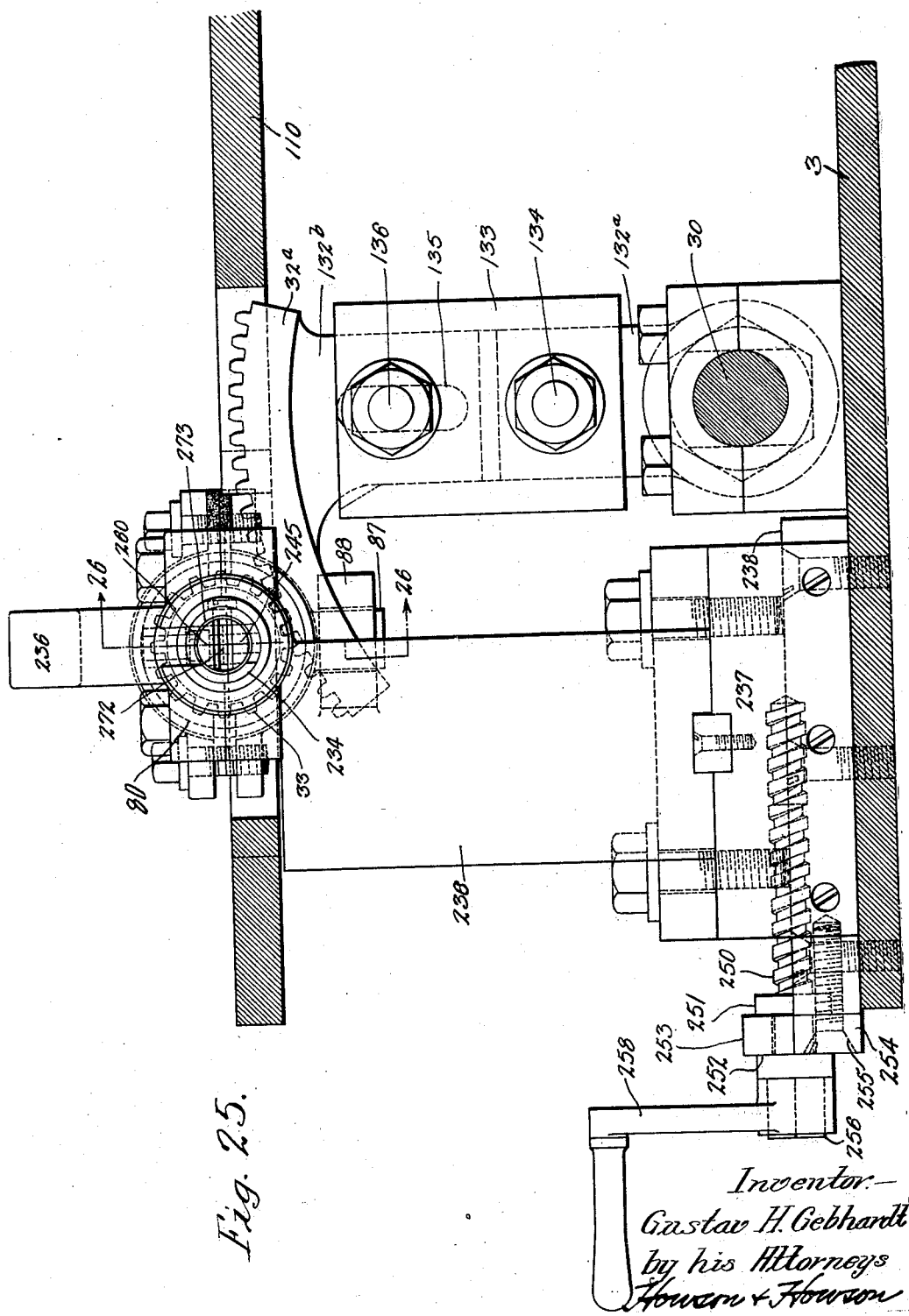

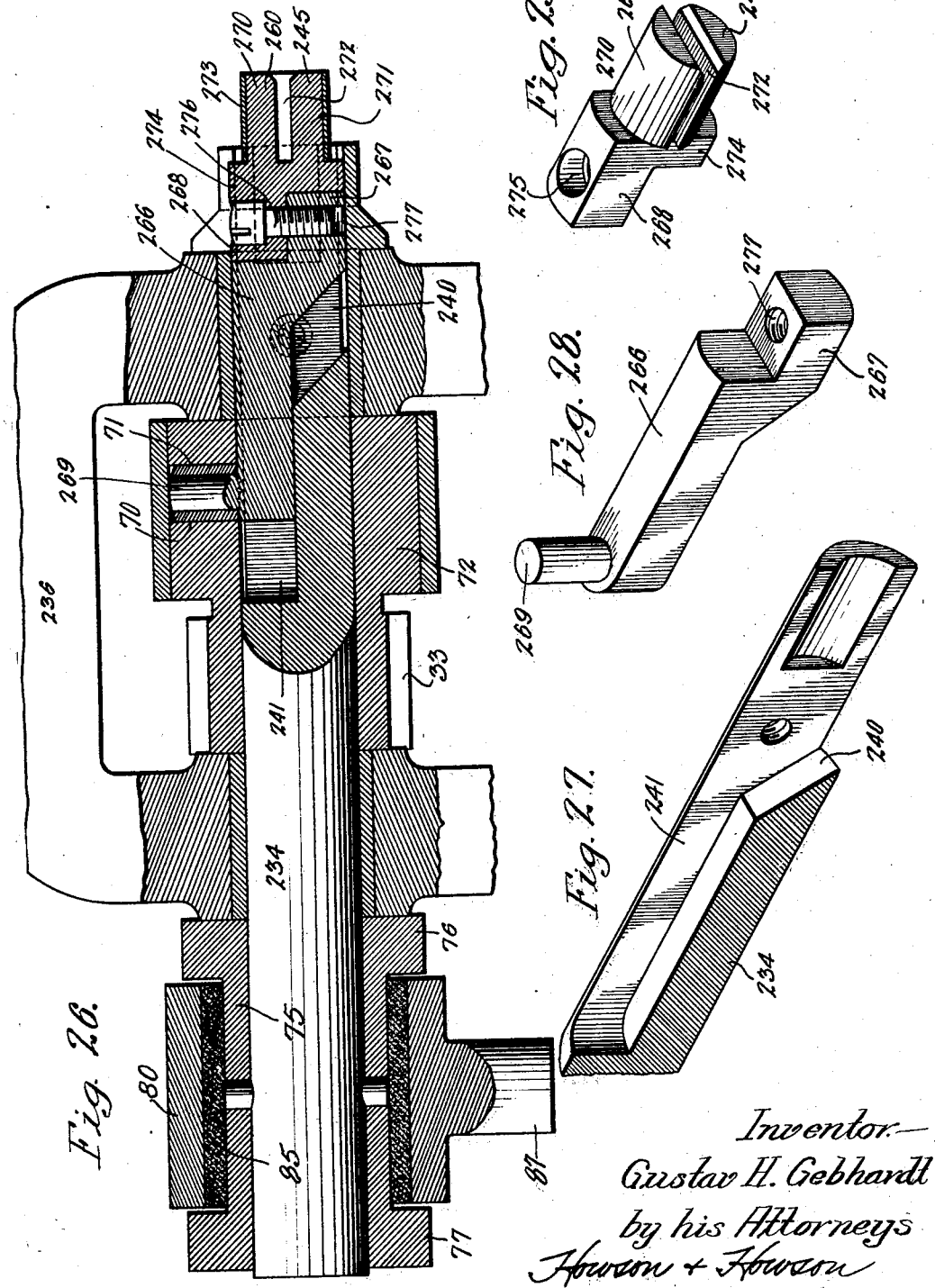

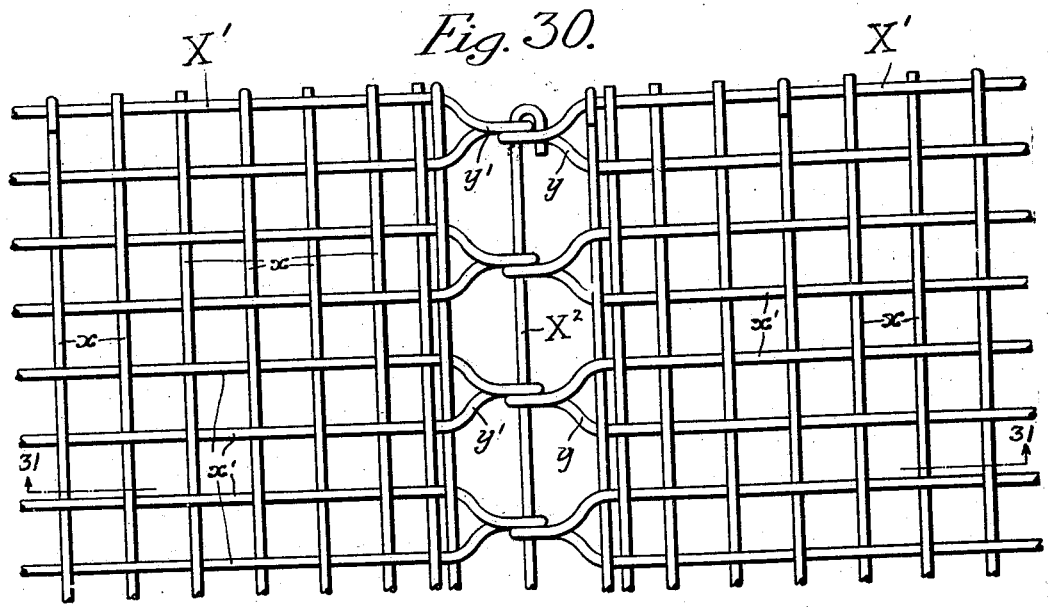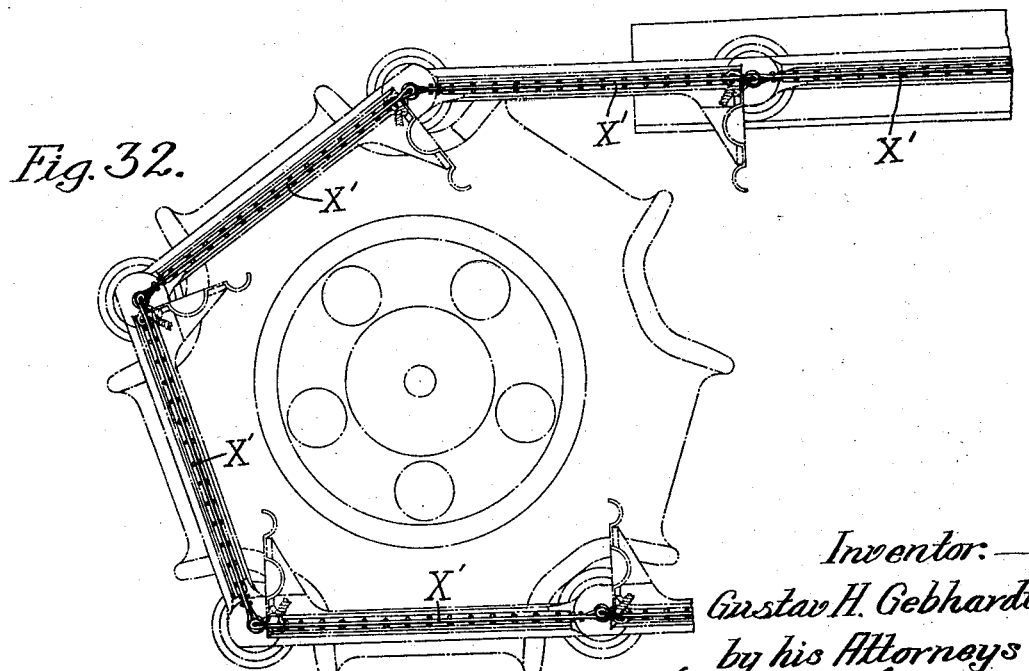

Patented June 17, 1930

1,765,228

UNITED STATES PATENT OFFICE

GUSTAV H. GEBHARDT, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

WIRE-LOOP-BENDING MACHINE

Application filed January 11, 1929. Serial No. 331,856.

This invention relates to a machine for bending or twisting wire loops from the plane in which they are originally formed to a plane substantially at right angles thereto. The machine forming the subject of my invention is particularly adapted for the twisting of loops formed at spaced intervals along the selvage edges of wire mesh screen.

The wire mesh screen in this particular instance is woven in a strip, which is subsequently cut into units of a predetermined size, after which the units are suitably attached one to another to form an endless belt or conveyer adapted for use in drying and other types of apparatus.

Conveyers of this type usually comprise a pair of spaced chains between which the units of wire mesh screen are placed. Each of the side chains consists of a plurality of pivotally connected links, and adjacently positioned screen units of the conveyer are pivotally connected together along their adjoining edges and in axial alignment with the chain pinties.

In placing the wire mesh units in position on the side links the selvage edges of each unit are positioned transversely of the conveyer, the non-selvage edges of the respective units being placed in suitable grooves formed in the inner sides of the respective side links and secured therein in any suitable manner.

In weaving the wire mesh screen the loops are formed at the selvage edges of the screen by a continuous weft wire being passed back and forth across the longitudinal or warp wires, the selvage loops thus formed lying in the same plane as the body of the wire mesh screen.

In order to pivotally connect the adjacent edges of adjacent screen sections together, it is necessary to bend the selvage loops from the plane of the body of the screen to a plane substantially perpendicular thereto.

Prior to my invention the twisting of these selvage loops was performed by hand, which required considerable time and was, therefore, an expensive operation.

The object of my invention is to provide a machine which will automatically twist the loops into the proper position to receive the connecting wire.

Other objects and the detailed construction of the invention will be fully disclosed hereinafter, reference being had to the accompanying drawings, of which:

Fig. 2 is a rear elevation of the machine illustrated in Fig. 1;

Fig. 3 is a right side elevation of the machine;

Fig. 4 is a left side elevation of the machine;

Fig. 5 is a plan view partly in section, certain portions of the machine being removed for the purpose of illustration;

Fig. 6 is a transverse sectional elevation taken on the line 6—6, Fig. 1;

Fig. 7 is a longitudinal sectional elevation taken on the line 7—7, Fig. 6;

Fig. 8 is an enlarged longitudinal sectional elevation taken on the line 8—8, Fig. 6;

Fig. 9 is an enlarged plan view of one of the loop-twisting heads;

Fig. 10 is a sectional elevation taken on the line 10—10, Fig. 9, and showing the loop-receiving jaws in their open positions;

Fig. 11 is a sectional elevation similar to Fig. 10, but showing the jaws in a closed position;

Fig. 12 is a sectional elevation taken on the line 12—12, Fig. 9;

Figure 1:
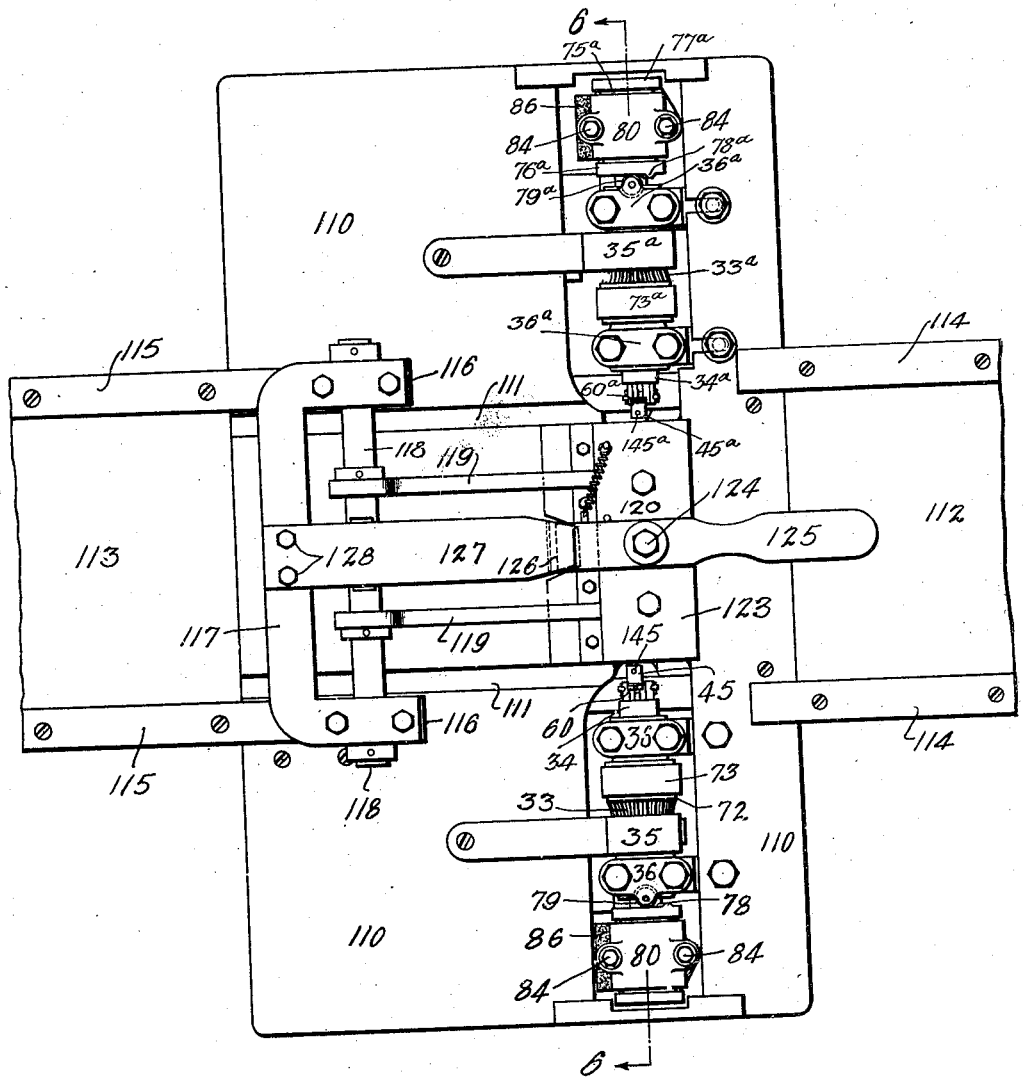
Fig. 1 is a plan view of the machine made in accordance with the principles of my invention.

Figs. 13 to 17 inclusive are perspective views of certain details of the twisting head shown in Figs. 9 to 12;

Figs. 18 to 21 inclusive are sectional elevations illustrating various positions progressively assumed by the feeding mechanism of the machine;

Fig. 22 is a fragmentary plan view showing the screen strip in position with respect to the twisting heads of the machine;

Fig. 23 is a side elevation of the clamp head showing the same in the raised position;

Fig. 24 is a front elevation of a modified form of twisting head;

Fig. 25 is an end elevation of the structure shown in Fig. 24, with other associated elements of the machine being shown in section;

Fig. 26 is a sectional elevation taken on the line 26—26, Fig. 25;

Figs. 27 to 29 inclusive are perspective views of certain details of the structure shown in Figs. 24, 25 and 26;

Fig. 30 is a fragmentary plan view of a pair of screen units pivotally united as in the formation of a conveyer;

Fig. 31 is a sectional elevation taken on the line 31—31, Fig. 30, and

Fig. 32 is a longitudinal sectional elevation of a portion of a conveyer showing the side links and the girts of the conveyer in broken lines and the said side links passing around a suitable sprocket.

As shown in Figs. 1 to 7 inclusive, the machine comprises end frames 1 and 2 which are spaced apart and are rigidly connected by a top plate 3 and a lower brace or shelf 4.

Secured to the end frame 2 by bolts 5, 5 is a plate 6. Pivoted to the plate 6 is an adjustable bracket 7 in which is adjustably mounted a stud 8. Rotatably mounted on the stud 8 is a drive pulley 9. On the end of the hub 10 of the driving pulley 9 is a pinion 11 which meshes with the teeth of a gear wheel 12, which is secured to a shaft 13. The shaft 13 is rotatably mounted in hangers 14, 14, which are secured to the under side of the top plate 3. Also secured to the shaft 13 is a pinion 15, a hand wheel, and a collar. The pinion 15 meshes with a gear wheel 16 which is secured to a shaft 17 rotatably mounted in bearings 18 secured to the under side of the top plate 3.

The gear wheel 16 meshes with a gear wheel 19 secured to a shaft 20 which is rotatably mounted in bearings 21, 21 secured to the upper surface of the top plate 3. The gear 19 meshes with a gear 22 which is secured to a shaft 23. The shaft 23 is rotatably mounted in bearings 24, 24, secured to the upper surface of the top plate 3.

On one of the ends of the shaft 20 is an eccentric 25. The eccentric 25 is encircled by an eccentric strap 26 which is provided with a lug 27 pivotally attached by a screw 28 to an arm 29 which is secured to a shaft 30. The shaft 30 is rotatably mounted in bearings 31, 31 rigidly secured to the upper side of the top plate 3. On the opposite ends of the shaft 30 are secured gear segments 32 and 32ª respectively. These gear segments respectively mesh with pinions 33 and 33ª rotatably mounted on spindles 34 and 34ª of loop-twisting heads 35 and 35ª respectively. The spindles 34 and 34ª of the twisting heads 35 and 35ª respectively are rotatably mounted in brackets 36, 36ª respectively, which are secured to the upper side of the top plate 3.

The construction and operation of the twisting heads 35 and 35ª are similar, therefore, a description of one will suffice for both.

The construction of one of these twisting heads is shown in detail in Figs. 9 to 17 inclusive.

The inner end of the spindle 34, or 34ª as the case may be, is transversely slotted as illustrated at 40. Extending longitudinally of the shaft 34 and connecting with the transverse slot 40 is an elongated groove 41, which is formed in one side of the said shaft or spindle 34. The slotted end of the spindle 34 is provided with an undercut 42, which communicates with and is of the same width as the transverse slot 40. The undercutting of the spindle 34 produces a lip 43 in the end of the said spindle 34. In the base of the longitudinally extending groove 41 is formed a groove 44 which is of lesser width than that of the groove 41, as clearly shown in Fig. 17. The base of the groove 41 adjacent the transverse slot 40 is curved as illustrated at 48.

The transverse groove 40 of the spindle 34 is adapted to receive the lower jaw 45 of the twisting head. This lower jaw 45 comprises a block 46 which is adapted to fit within the transverse groove 40 adjacent the side of the spindle 34 opposite to that in which the groove 41 is formed. The block 46 is provided with a lug or extension 47 which constitutes the lower jaw proper.

The end of the block 46, opposite to that on which the jaw 47 is formed, is provided with a pair of spaced projections 49 and 50, between which is formed a transversely extending groove 51. The groove 51 is adapted to receive the lip 43 formed in the end of the spindle 34. The projection 50 of the block 46 is adapted to extend into the undercut 42 of the spindle 34, and the projection 49 of the block 46 is adapted to fit within the space formed by the curved portion 48 of the base of the groove 41, so that when the lower jaw element 45 is in position within the end of the spindle 34 the top surface 52 of the block 46 will be substantially in alignment with the bottom surface or base 53 of the groove 41 and the plane of the two surfaces will be substantially at the center of rotation of the spindle 34 as clearly shown in Fig. 10.

The lower jaw element 45 is secured in position within the end of the spindle 34 by means of a screw 54, which passes through an opening 55 formed in one side of the spindle 34, through an opening 56 formed in the block 46, and has a threaded end which extends into and engages the threads in an opening 57 formed in the opposite side of the spindle 34.

The movable jaw 60 of each twisting head is in the form of a bell crank lever, the one arm 61 of which comprises the movable jaw proper. The said movable jaw 60 is pivotally mounted on a pin 62 secured in the end of the spindle 34. The second arm 63 of the movable jaw 60 is connected at 64 to one end of a link 65. The opposite end of the link 65 rides in the groove 44 in the spindle 34, as clearly shown in Fig. 11, the said end also fitting within a slot 65ª formed in one end of a slide bar 66 which is slidably mounted in the groove 41 formed in the spindle 34. The link 65 is provided with a notch 67 within which lies a pin 68 carried by the slide bar 66, constituting the means by which the link 65 is pivotally connected to the slide bar 66. The opposite end of the slide bar 66 is provided with a pin 69 on which is rotatably mounted a sleeve or roller 70. The roller 70 rides in a cam groove 71 formed in the hub 72 of the pinion 33, said cam groove being enclosed by a sleeve 73 fitting over the hub 72 and the said pinion 33.

Secured to the spindle 34 by a pin 74 is a sleeve or collar 75 which is provided with flanges 76 and 77 at its respective ends. The flange 76 is provided with a cam rise 78 which is adapted to engage a cam roller 79 rotatably mounted on the bracket 36 in which the spindle 34 is rotatably mounted.

Encircling the sleeve 75 between the flanges 76 and 77 is a split collar 80, comprising a lower portion 81 and an upper portion 82, each of which are provided with laterally extending lugs 83 adapted to receive adjusting or tightening screws 84, 84, as clearly shown in Fig. 12.

Intermediate the split collar 80 and the sleeve 75 is a band of friction material 85, the ends 86 of which are anchored between one pair of the oppositely disposed lugs 83, 83 of the split collar 80.

The lower portion 81 of the split collar 80 is provided with a depending projection 87 which is engaged by a rigid arm 88 extending laterally from the bracket 36, as clearly shown in Fig. 2. By this means the split collar 80 and the brake lining 85 thereof are prevented from turning.

Pivotally mounted in bearings 90, 90, which are secured to the upper side of the top plate 3, is a rock shaft 91 which is provided with a pair of spaced arms 92, 92 which are slotted at 93 to adjustably support pivot pins 94, 94, on which are pivotally mounted arms 95, 95, respectively. The outer ends of the arms 95, 95 are connected by a feed bar 96, as clearly shown in Figs. 5, 7 and 18 to 21 inclusive.

Secured to the rock shaft 91 is an arm 97, on the outer end of which is rotatably mounted a roller or cam follower 98, which is adapted to engage a cam 99 secured to the shaft 20. Also secured to the rock shaft 91 is an arm 100.

To the outer end of the arm 100 is secured one end of the spring 101, the opposite end of which is secured to an adjusting screw 102 carried by a bracket 103 secured to the top plate 3. The spring 101 maintains the cam roller 98 of the arm 97 in contact with the cam 99 at all times.

Rotatably mounted on each of the arms 95 is a roller 104. These rollers 104 are adapted to respectively engage cams 105, 105 secured to the shaft 23.

Secured to the feed bar 96 is one end of a spring 106, the opposite end of which is secured to a pin 107 which extends laterally from one of the brackets 24, as clearly shown in Fig. 6.

Supported above the top plate 3 on the brackets 36, 36ª and brackets 108, 108, is a table 110 which is provided with spaced grooves 111, 111 as clearly shown in Fig. 1. Secured to and extending laterally from the front and rear edges, respectively, of the table 110 are extensions 112 and 113, which are respectively provided with side flanges 114 and 115.

Secured to the table 110 is a pair of blocks 116, 116 which are connected by a bridge element 117. Also secured in the blocks 116, 116 and extending therebetween is a rod 118 on which are pivotally mounted arms 119, 119 of a clamp head 120. The outer ends of the arms 119, 119 are connected by a bar 121, to which is rigidly secured a clamp plate 122. Secured to the clamp plate 122 is a suitable weight 123.

Pivotally mounted at 124 to the weight 123 is a latch 125, one end 126 of which is adapted to be extended under one end of a flat spring 127, the opposite end of which is rigidly secured to the bridge element 117 by bolts 128, 128.

Also secured to the bridge element 117 by the bolts 128 is a second flat spring 129, the free end of which engages the under side of the spring 127 adjacent the end of the latch 126, as clearly shown in Fig. 7.

As clearly shown in Fig. 22, the screen strip X comprises a plurality of parallel longitudinal or warp wires $x$ and a plurality of transverse or weft wires $x^1$. As shown in said figure, the weft wires $x^1$ are composed of a single wire passing back and forth at right angles to the warp wires $x$, the said wire being interwoven with the warp wires $x$ in the usual manner. The passing of the weft wire back and forth across the warp wires in the weaving of the wire mesh screen produces loops $y$, $y^1$ at the opposite edges of the body of the screen X. These loops $y$, $y^1$ lie in substantially the same plane as the body of the screen X, and the object of this invention is to automatically twist these loops $y$, $y^1$ from the plane of the body of the screen X to a plane substantially perpendicular thereto.

In the operation of the machine one end of a strip of woven screen X is placed on the extension 112 of the table 110 between the side flanges 114, 114 thereof, the clamp head 120 having been moved to the broken line position illustrated in Fig. 7. The end of the strip of woven screen X is then advanced along the table 110 to a position over a slot 130 formed in the table 110, in which the feed bar 96 is adapted to operate.

The clamp head 120 is then swung about its pivot 118 from its broken line position shown in Fig. 7 to its full line position shown in said figure, the latch 125 being turned on its pivot 124 in such a manner that the end 126 of said latch will pass to one side of and below the spring 127, whereupon the latch 125 is turned to a position substantially in alignment with the spring 127, with the end 126 of said latch in engagement with the under side of said spring. The strip of material X is thereby clamped down firmly against the upper surface of the table 110. It will be understood that the movable jaws 60 of the twisting heads 35 and 35$^a$, respectively, will be in the open position as shown in Figs. 6 and 10.

As shown in Figs. 10 and 16, the lower or stationary jaw 45 of each twisting head is provided with a pin 145 and each of the upper or movable jaws 60 of each twisting head is provided with a slot 160 which, when in the closed position illustrated in Fig. 11, is adapted to fit over and around the pin 145 of the corresponding stationary jaw 45.

In positioning the wire mesh screen in the machine at the start of the operation one of the loops $y^1$ at one edge of the strip X is placed around the pin 45$^a$ of the twisting head 35$^a$, and one of the loops $y$ at the opposite side of the strip X is placed around the pin 145 of the twisting head 35.

As shown in Figs. 6, 7 and 18 to 21 inclusive the feeding bar 96 is provided with pins 196 on its upper surface which are adapted to enter the meshes of the strip of wire mesh screen.

After the screen strip X has been placed in position and the clamp head 120 moved to its clamping position, power is applied to the drive pulley 9 which, through the train of gears above described, causes a rotation of the shafts 20 and 23. Rotation of the shaft 20 causes a corresponding rotation of the eccentric 25 carried thereby, which, through the eccentric strap 26 and arm 29, effects a rocking motion or oscillation of the shaft 30. Oscillation of the shaft 30 effects a reciprocation of the gear segments 32 and 32$^a$ which causes a corresponding oscillation of the pinions 33, 33$^a$ of the twisting heads 35 and 35$^a$ respectively.

Referring to Figs. 9 and 10, the initial movement of the pinion 33 in the direction of the arrow $z$ will cause the cam groove 71 in the hub of the pinion to engage one side of the roller 70 of the slide bar 66, and thereby move the said slide bar 66 longitudinally of the spindle 34, from the position shown in Figs. 9 and 10 to the position shown in Fig. 11, it being understood that rotation of the spindle 34 at this time is prevented by the brake comprising the split collar 80, the brake lining 85, depending projection 87, and the anchoring bracket 88.

This initial rotation of the pinions 33, 33$^a$ and the longitudinal movement of the slide bars 66, 66 effected thereby causes the movable jaws 60 and 60$^a$ of the twisting heads 35 and 35$^a$ respectively to turn on their pivots 62, from the position shown in Fig. 10 to that shown in Fig. 11, thereby clamping the loops $y$, $y^1$, which are registered with the stationary jaws 45 and 45$^a$ of the said respective twisting heads, between the co-operating movable and stationary jaws of the respective twisting heads.

Continued rotation of the pinions 33, 33$^a$ after the jaws 60 and 60$^a$ have been closed, causes a substantially ninety degree rotation of the spindles 34 and the jaws carried thereby, which twists the loops $y$ and $y^1$ from the horizontal plane shown in Figs. 9, 10 and 22 to a vertical plane, as shown in said Figs. 9 and 22.

During this partial rotation of the spindles 34, 34$^a$ the cam rises 78, 78$^a$ formed on the sleeves 75, 75$^a$ respectively, which rotate with the spindles 34, 34$^a$ engage the cam rollers 79, 79$^a$, which are rotatably mounted on the fixed brackets 36, 36$^a$.

Engagement of the cam rise 78 with the corresponding roller 79 effects an axial movement of the spindle 34 and this in turn causes the pin 145 to pull against the end of the loop with which it is engaged. This movement pulls the curved end of the loop into the proper position to receive the connecting wire by which adjacent screen units are pivotally attached to each other.

Continued rotation of the shaft 20 causes a movement of the segments 32, 32$^a$ in an opposite direction to that previously noted, which causes the pinions 33, 33$^a$ to rotate in an opposite direction from that just described.

Due to the retarding action of the brake on each spindle 34, 34$^a$ and to the lost motion provided between the pinions 33, 33$^a$ and their spindles 34, 34$^a$ the initial movement of the pinion 33, 33$^a$ thereon will, through the cam grooves 71 and rollers 70, effect a movement of the slide bars 66 in an opposite direction to that above noted.

This reverse movement of the slide bars 66 will, through the links 65, cause the movable jaws 60, 60$^a$ to be turned about their pivots 62, from their closed position to their open position.

It will be noted that at this time the spindles 34, 34$^a$ are still in such position that the pins 145, 145$^a$ are in a horizontal position pointing toward the back of the machine and that the twisted loops lie against the face of the stationary jaws 45 which is nearest the back end of the machine and that the movable jaws 60 and 60$^a$ are open to such an extent that they are clear of the side edges of the strip of material, thus a movement of the strip of screen toward the back of the machine will carry the twisted loops off of the pins 145, 145$^a$.

Figure 19:
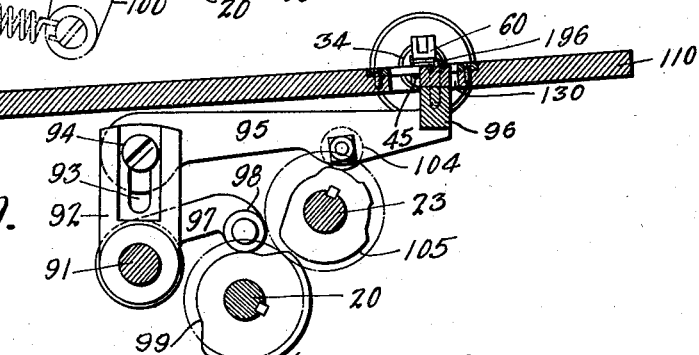
Figure 20:
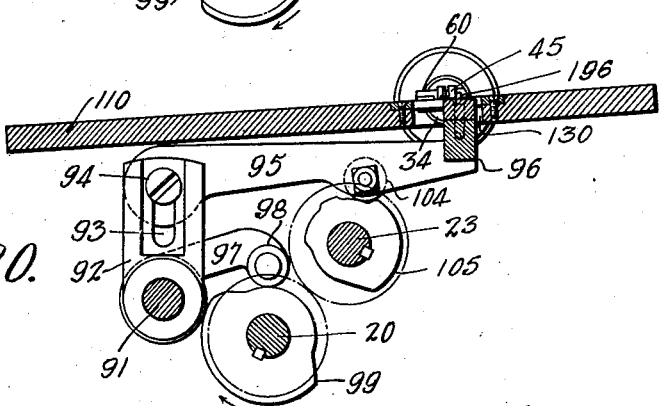

This advancing movement of the strip is effected by the feed bar 96 which, as shown in Fig. 19, is raised by the cams 105 engaging the rollers 104 on the arms 95. Raising of the bar 96 causes the pins 196 on the upper side thereof to enter the meshes of the screen material. The shaft 91 is then rocked about its center by the cam 99, on the shaft 20, engaging the roller 98 on the arm 97 of the shaft 91.

Oscillation of the shaft 91 causes a corresponding oscillation of the arms 92 which move the arms 95 and the feed bar 96 carried thereby toward the rear of the machine.

Figure 21:
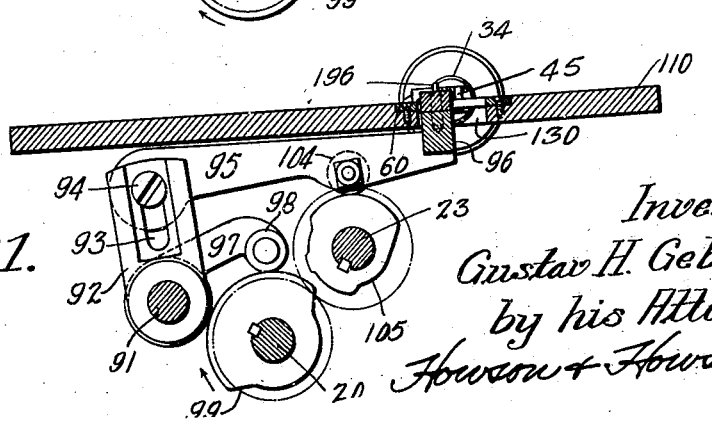

As soon as the twisted loops $y$ and $y^1$ are clear of the pins 145, 145$^a$ the continued rotation of the pinions 33, 33$^a$ causes the spindles 34, 34$^a$ to be rotated in a reverse direction, which carries the pins 145 and 145$^a$ from their horizontal loop-releasing positions to their vertical or loop-receiving positions, and as the feed bar 96 moves the screen material rearwardly the said bar 96 is raised by the cams 105 to such a position that a fresh pair of horizontally disposed loops $y$ and $y^1$ are carried above the plane of the points of the pins 145 and 145$^a$ and to a position directly above said pins, as shown in Fig. 21.

Figure 18:
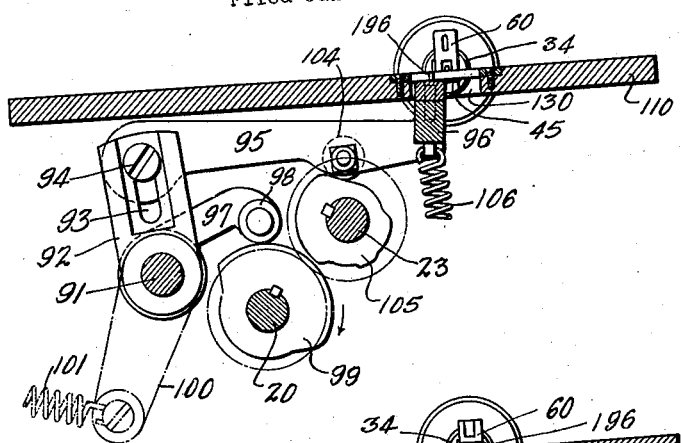

Continued rotation of the cams 105 causes the feed bar 96 to be lowered from the position shown in Fig. 21 to that shown in Fig. 18, which lowers the untwisted loops $y$ and $y^1$ onto the fixed jaws 45 and 45$^a$ of the twisting heads 35 and 35$^a$ respectively, for a repeat of the cycle of operations just described.

Obviously continued rotation of the cam 99 will effect a reverse movement of the feed bar 96 toward the front of the machine, below the plane of the wire mesh screen, for the purpose of obtaining a new grip on the said material.

In passing to the rear of the machine the vertically disposed loops $y$ and $y^1$ pass off through the grooves 111, 111 formed in the top of the table 110.

Upon referring to Fig. 22, it will be noted that the spindles 34, 34$^a$ of the twisting heads 35, 35$^a$ respectively are not in direct alignment with each other but are horizontally spaced, the distance equal to the space between two of the weft wires $x^1$, and in order to effect the proper meshing of the teeth of the gear segment 32$^a$ with the teeth of the pinion 33$^a$ of the twisting head 35$^a$ the arm 132 of the segment 32$^a$ (see Fig. 4) is formed of two parts, 132$^a$ and 132$^b$ respectively. A grooved block 133 is secured to the portion 132$^a$ of said arm by a bolt 134. The portion 132$^b$ of the arm 132 is slotted at 135 for the reception of the bolt 136, by which the portion 132$^b$ is rigidly secured to the block 133.

After the loops $y$ and $y^1$ of a strip X of screen material have been twisted from their horizontal plane to the vertical plane, as above noted, the strip is cut into predetermined lengths, forming units X$^1$. These units X$^1$ are then placed on and secured in the side links of the conveyer chains as above noted, and, as shown in Fig. 32, with the twisted loops $y^1$ of one unit lying immediately adjacent the twisted loops $y$ of the adjacent unit, as clearly shown in Fig. 30. A connecting wire X$^2$ is then passed through the aligned openings of the loops $y$, $y^1$ as clearly shown in Fig. 31. These connecting wires X$^2$ are positioned in axial alignment with the pintles of the side chains of the conveyer, thereby permitting the conveyer to readily pass around the supporting sprockets as clearly shown in Fig. 32.

During the normal operation of the machine the clamping head 120 is at all times held down by the spring 127 which, when the feed bar 96 is raised to carry the new loops into position above the pins 145, 145$^a$, yields sufficiently to permit of this operation.

The clamp plate 122 is provided with grooves 122$^a$ which accommodate the pins 196 of the feed bar 96 and permit the same to move with respect to the clamp plate 122 and at the same time maintain a firm grip on the strip of screen material X.

If it be desired to operate the clamp head 120 by hand the latch 125 is moved to the position illustrated in Fig. 23, wherein the end 126 of said latch lies on the upper surface of the spring 127, at which time the spring 129 assists in the support of the said clamp head 120 and yields when pressure is applied to bring the clamp head down upon the top of the strip X of the material.

In Figs. 24 to 29 inclusive, I have illustrated a modified form of twisting head which comprises a spindle 234 having a longitudinally extending groove 241 formed therein, in which is slidably mounted a slide bar 266. The slide bar 266 is provided with a depending step 267, which is adapted to receive a projection 268 of a loop-twisting element 270.

In this form of the invention the twisting element 270 is in the form of a cylinder 271 having a transversely extending slot 272 formed therein, which divides the twisting element 271 into a lower jaw 245 and an upper jaw 260. The cylindrical twisting element 271 is encircled by a sleeve 273 which closes the ends of the slot 272.

To the rear of the cylindrical portion 271 of the twisting piece 270 and formed integral therewith is a flat sided portion 274 which, together with the depending step 267 of the slide bar 266, is adapted to slide within a transverse slot 240 formed in the spindle 234. This transverse slot 240 communicates with the groove 241 formed in the said spindle.

The lug 268 of the twisting piece 270 extends rearwardly from the flat sided portion 274 of the said twisting piece and is provided with an aperture 275 which is adapted to receive a screw 276 that is threaded into an opening 277 formed in the depending step 267 of the slide bar 266, for the purpose of securing the twisting piece 270 to the slide bar 266.

The slide bar 266 at its opposite end is provided with the roller 70 which operates in the cam groove 71 formed in the hub 72 of the pinion 33. The spindle 234 is also provided with the sleeve 75, the brake band 85 and the split collar 80 as above described, the spindle 234 being suitably mounted in a bracket 236, and the split collar 80 being provided with the depending portion 87 which is engaged by the extension 88 which projects laterally from the bracket 236 and prevents the split collar 80 and the brake band 85 from rotating, as above noted.

In this form of the device the loops y formed at the side of the screen are brought successively into axial alignment with the spindle 234. The initial movement or rotation of the pinion 33 causes the twisting piece 270 to be projected axially from the end of the spindle 234, the said spindle being held against rotation during this movement by its brake, and the axial movement of the twisting piece being effected by the cam groove 71 in the hub 72 of the pinion 33 engaging with the roller 70 on the slide bar 266. As the twisting piece 270 moves outwardly with respect to the spindle 234 the loop y aligned therewith enters the slot 272 in the said twisting piece 270. Continued rotation of the pinion 33, after the end of the cam groove 71 engages the roller 70 of the slide bar 266, causes a similar rotation of the twisting piece 270, approximately ninety degrees, thereby twisting the engaged loop from its normal plane, coincident with that of the body of the wire screen, to a plane substantially perpendicular thereto.

Reverse rotation of the pinion 33 will cause the twisting piece 270 to be moved in an opposite longitudinal direction with respect to the spindle 234, which causes the said twisting piece to move longitudinally of and from the twisted loop. When the said twisting piece is clear of the twisted loop continued rotation of the pinion 33 in this reverse direction will rotate the spindle 234 and the twisting piece 270 so that the slot 272 therein will be moved from the vertical position to the horizontal position to receive another untwisted loop y.

This form of twisting head obviates the necessity of raising the untwisted loops during the feeding of the screen in order that the loops may be properly positioned between the twisting jaws of the twisting head as above described and allows the feeding of the screen strip in a single horizontal plane.

In Figs. 24 and 25, I have illustrated a means by which one of the twisting heads may be adjusted into alignment with the loops along one side of the screen, it being understod that the twisting head which operates on the loops at the opposite side of the screen may be stationary. This adjustment of one of the twisting heads is provided to accommodate variation in the spacing of the weft wires which will affect the distance between the centers of the loops.

In order to effect this adjustment of the twisting head the bracket 236 is secured to a suitable slide block 237, which is provided with an undercut groove 238, which is adapted to receive a dovetailed bar 239 secured to the top plate 3. Threaded into the slide block 237 is a screw 250 which has a head 251 provided with an annular groove 252, which is adapted to receive the yoked end 253 of a plate 254, which is secured to the end of the guide 239 by means of screws 255. The outer end of the screw 250 is squared, as at 256, to receive a correspondingly shaped opening formed in the hub 257 of the adjusting handle 258.

Rotation of the adjusting handle 258 and consequently the screw 250 will cause a lateral movement of the bracket 236 and the twisting head which is rotatably mounted therein.

As above noted the gear segment $32^a$ which meshes with the pinion 33 of the twisting head may be adjusted with respect to the shaft 30 to accommodate this lateral adjustment of the twisting head.

I claim:

1. In a machine for twisting loops formed at spaced intervals along the edge of a wire mesh screen, from a plane coincident with the plane of the body of the screen to a plane disposed at an angle with respect thereto, the combination of a twisting head comprising means for gripping one of said loops and means adapted to enter the gripped loop, means for rotating said twisting head to twist the engaged loop, means for axially moving the twisting head to stretch the loop longitudinally to a predetermined position relative to the body of the screen, and means for releasing the twisted loop from the twisting head.

2. In a machine for twisting loops formed at spaced intervals along the edge of a wire mesh screen, from a plane coincident with the plane of the body of the screen to a plane disposed at an angle with respect thereto, the combination of a pair of twisting heads disposed at opposite edges of the screen and each comprising means for gripping one of said loops and means adapted to enter the loop gripped thereby, means for rotating said twisting heads to twist the engaged loops, means for moving the twisting heads axially and simultaneously in opposite directions to stretch the respective gripped loops into predetermined positions relative to each other and to the body of the screen, and means for releasing the twisted loops from the twisting heads.

3. In a machine for twisting loops formed at spaced intervals along the edge of a wire mesh screen, from a plane coincident with the plane of the body of the screen to a plane disposed at an angle with respect thereto, the combination of a pair of twisting heads disposed at opposite edges of the screens and each comprising means for gripping one of said loops and means adapted to enter the loop gripped thereby, means for rotating said twisting heads to twist the engaged loops, means for moving the twisting heads axially and simultaneously in opposite directions to stretch the respective gripped loops into predetermined positions relative to each other and to the body of the screen, and means for releasing the twisted loops from the twisting heads, and means for gripping the body of the screen intermediate the twisting heads to prevent distortion thereof during the twisting and stretching operation.

4. In a machine for simultaneously twisting loops formed at spaced intervals along the oppositely disposed edges of a wire mesh screen, from a plane coincident with the plane of the body of the screen to a plane disposed at an angle with respect thereto, the combination of a pair of twisting heads located at opposite edges of the screen and each comprising means for gripping one of said loops and means adapted to enter the loop gripped thereby, means for rotating said twisting heads to twist the engaged loops, means for moving the twisting heads axially and simultaneously in opposite directions to stretch the respective gripped loops into predetermined positions relative to each other and to the body of the screen, and means for releasing the twisted loops from the twisting heads, means for advancing the screen to move the twisted loops from alignment with the twisting heads and to align an untwisted loop with each of said twisting heads, and means extending across the screen intermediate the twisting heads for gripping the body of the screen to prevent distortion thereof during the twisting and stretching operation.

5. In a machine for simultaneously twisting loops formed at spaced intervals along the oppositely disposed edges of a wire mesh screen, from a plane coincident with the plane of the body of the screen to a plane disposed at an angle with respect thereto, the combination of a table adapted to receive the screen, means extending across the screen from edge to edge thereof for pressing the screen firmly against the table, a twisting head rotatably mounted at each of the oppositely disposed edges of the table at the ends of the pressing means and in a plane substantially coincident with that of the table, means carried by each twisting head adapted to enter the loop engaged thereby, means for moving the twisting heads axially and simultaneously in opposite directions to stretch the engaged loops into predetermined positions relative to each other and to the body of the screen, means for advancing the screen along the table to align the loops successively with said twisting heads, means in each said twisting head for gripping the loop aligned therewith, and means for rotating said twisting head to twist said loop.

6. In a machine for twisting loops formed at spaced intervals along the edge of a wire mesh screen, from a plane coincident with the plane of the body of the screen to a plane disposed at an angle with respect thereto, the combination of a table adapted to receive the screen, a weighted clamp head for pressing the screen firmly against the table, a twisting head rotatably mounted in a plane substantially coincident with that of the table, means for advancing the screen along the table to align the loops successively with said twisting head, means in said twisting head for gripping the loop aligned therewith, and means for rotating said twisting head to twist said loop.

7. In a machine for twisting loops formed at spaced intervals along the edge of a wire mesh screen, from a plane coincident with the plane of the body of the screen to a plane disposed at an angle with respect thereto, the combination of a table adapted to receive the screen, a weighted clamp head for pressing the screen firmly against the table, resilient means for pressing said clamp head into yielding contact with said screen, a twisting head rotatably mounted in a plane substantially coincident with that of the table, means for advancing the screen along the table to align the loops successively with said twisting head, means in said twisting head for gripping the loop aligned therewith, and means for rotating said twisting head to twist said loop.

8. In a machine for twisting loops formed at spaced intervals along the edge of a wire mesh screen, from a plane coincident with the plane of the body of the screen to a plane disposed at an angle with respect thereto, the combination of a table adapted to receive the screen, a weighted clamp head for pressing the screen firmly against the table, resilient means for pressing said clamp head into yielding contact with said screen, manually operable means for operatively connecting said resilient means with said clamp head, a twisting head rotatably mounted in a plane substantially coincident with that of the table, means for advancing the screen along the table to align the loops successively with said twisting head, means in said twisting head for gripping the loop aligned therewith, and means for rotating said twisting head to twist said loop.

10. In a machine for twisting loops formed at spaced intervals along the edge of a wire mesh screen, from a plane coincident with the plane of the body of the screen to a plane disposed at an angle with respect thereto, the combination of a table adapted to receive the screen, means for pressing the screen firmly against the table, a twisting head rotatably mounted in a plane substantially coincident with that of the table, means for advancing the screen along the table to align the loops successively with said twisting head comprising a feed bar, projections on said bar adapted to enter the meshes of said screen, means for moving the feed bar into contact with the screen and means for moving the feed bar laterally, means in said twisting head for gripping the loop aligned therewith, and means for rotating said twisting head to twist said loop.

10. In a machine for twisting loops formed at spaced intervals along the edge of a wire mesh screen, from a plane coincident with the plane of the body of the screen to a plane disposed at an angle with respect thereto, the combination of a table adapted to receive the screen, means for pressing the screen firmly against the table, a twisting head rotatably mounted in a plane substantially coincident with that of the table, means for advancing the screen along the table to align the loops successively with said twisting head comprising a feed bar, projections on said feed bar adapted to enter the meshes of said screen, a cam for moving the feed bar into engagement with the screen and a cam for moving said feed bar laterally, means in said twisting head for gripping the loop aligned therewith, and means for rotating said twisting head to twist said loop.

11. In a machine for twisting loops formed at spaced intervals along the edge of a wire mesh screen, from a plane coincident with the plane of the body of the screen to a plane disposed at an angle with respect thereto, the combination of a table adapted to receive the screen, means for pressing the screen firmly against the table, a twisting head rotatably mounted in a plane substantially coincident with that of the table, means for advancing the screen along the table to align the loops successively with said twisting head comprising a feed bar, projections on said bar adapted to enter the meshes of said screen, a rotating shaft, a cam on said shaft for moving said bar into contact with the screen, a second rotating shaft, a rock shaft, spaced arms on said rock shaft, levers pivoted to said spaced arms and operatively connected at their outer ends to said feed bar, an arm on said rock shaft having a cam follower on its outer end, a cam on said second cam shaft engaged by said cam follower and adapted for moving said feed bar laterally, means in said twisting head for gripping the loop aligned therewith, and means for rotating said twisting head to twist said loop.

12. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, means carried by said spindle and including means adapted to enter the loop to maintain an opening of predetermined dimensions therein for operating said loop-gripping means to engage and subsequently disengage one of said loops, and means for rotating the twisting head.

13. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, a pinion rotatably mounted on said spindle, a cam on the hub of said pinion, means for operatively connecting the said cam with the said loop-gripping means for operating said gripping means to grip and subsequently release one of said loops, and means for oscillating said pinion for operating the said loop-gripping means of said twisting head.

14. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, a pinion rotatably mounted on said spindle, a cam on the hub of said pinion, means for operatively connecting the said cam with the said loop-gripping means for operating said gripping means to grip and subsequently release one of said loops, means for oscillating said pinion for operating the said loop-gripping means of said twisting head, and means for retarding the rotation of said spindle throughout the oscillation of said pinion, whereby the initial rotation of the pinion in one direction will operate the loop-gripping means to grip the loop and subsequent rotation of the pinion will twist the engaged loop, and the initial rotation of the pinion in the opposite direction will operate the loop-gripping means to release the twisted loop and subsequent rotation of the pinion in this direction will return the spindle and the wire-gripping means to the position to receive another loop.

15. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, a common operating element for said spindle and the loop-gripping means carried thereby, means permitting lost motion between the said common operating element and said spindle, whereby initial operation of said common operating element will operate said gripping means to grip a loop and subsequent operation of said common operating element will effect rotation of the spindle to twist said loop.

16. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, a common operating element for said spindle and the loop-gripping means carried thereby, means permitting lost motion between the said common operating element and said spindle, whereby initial operation of said common operating element will operate said gripping means to grip a loop and subsequent operation of said common operating element will effect rotation of the spindle to twist said loop, and means for reciprocating said common operating element.

17. In a machine for twisting loops formed at spaced intervals along the edge of a wire mesh screen, from a plane coincident with the plane of the body of the screen to a plane disposed at an angle with respect thereto, the combination of a twisting head comprising a spindle, loop-gripping means carried by said spindle, a common operating element for said spindle and the loop-gripping means carried thereby, means permitting lost motion between the said common operating element and said spindle, whereby initial operation of said common operating element will operate said gripping means to grip a loop and subsequent operation of said common operating element will effect rotation of the spindle to twist said loop, means for reciprocating said common operating element, and means for retarding the operation of said spindle during the reciprocation of said common operating element.

18. In a machine for twisting loops formed at spaced intervals along the edge of a wire mesh screen, from a plane coincident with the plane of the body of the screen to a plane disposed at an angle with respect hereto, the combination of a twisting head comprising a spindle, a stationary jaw carried by said spindle, a movable jaw pivoted to said spindle, a cam rotatably mounted on said spindle, a slide bar mounted in a groove formed in said spindle, a projection on said slide bar and engaging said cam, a link connecting said slide bar with said pivoted jaw, means for oscillating said cam, means permitting lost motion between said cam and said spindle, and means for retarding the rotation of said spindle throughout the oscillation of said cam.

19. In a machine for twisting loops formed at spaced intervals along the edge of a wire mesh screen, from a plane coincident with the plane of the body of the screen to a plane disposed at an angle with respect thereto, the combination of a twisting head comprising a spindle, a stationary jaw carried by said spindle, a movable jaw pivoted to said spindle, a cam rotatably mounted on said spindle, a slide bar mounted in a groove formed in said spindle, a projection on said slide bar and engaging said cam, a link connecting said slide bar with said pivoted jaw, means for oscillating said cam, means permitting lost motion between said cam and said spindle, means for retarding the rotation of said spindle throughout the oscillation of said cam, and means for moving said spindle axially.

20. In a machine for twisting loops formed at spaced intervals along the edge of a wire mesh screen, from a plane coincident with the plane of the body of the screen to a plane disposed at an angle with respect thereto, the combination of a twisting head comprising a spindle, a stationary jaw carried by said spindle, a movable jaw pivoted on said spindle, a pinion rotatably mounted on said spindle and having a cam slot formed in one of its ends, a slide bar mounted in a groove formed in said spindle, a projection on said slide bar and extending into said cam slot and acting as a means whereby said slide bar is moved axially of said spindle and as a means for permitting a predetermined amount of lost rotary motion between said pinion and said spindle before said spindle will be rotated by said pinion, a link connecting said slide bar with said movable jaw, means for oscillating said pinion, and means for retarding the rotation of said spindle.

GUSTAV H. GEBHARDT.